United States Patent [19]

Maassen et al.

[11] Patent Number: 4,492,451
[45] Date of Patent: Jan. 8, 1985

[54] ELECTRONIC FLASH UNIT

[75] Inventors: Egbertus J. P. Maassen; Frederik J. de Jong, both of Eindhoven, Netherlands

[73] Assignee: U.S. Philips Corporation, New York, N.Y.

[21] Appl. No.: 628,951

[22] Filed: Jul. 5, 1984

Related U.S. Application Data

[63] Continuation of Ser. No. 456,941, Jan. 10, 1983, abandoned.

[30] Foreign Application Priority Data

Jun. 26, 1982 [DE] Fed. Rep. of Germany ... 8218380[U]

[51] Int. Cl.³ .............................................. G03B 15/05
[52] U.S. Cl. ....................................... 354/416; 354/131
[58] Field of Search ................... 354/33, 34, 131, 154, 354/64, 35, 145.1, 416

[56] References Cited

U.S. PATENT DOCUMENTS

| | | | |
|---|---|---|---|
| 3,952,190 | 4/1976 | Perkins | 354/145 |
| 4,012,749 | 3/1977 | Numata | 354/145 |
| 4,201,934 | 5/1980 | Esaki | 354/145 |
| 4,252,426 | 2/1981 | Kuraishi | 354/131 |
| 4,329,624 | 5/1982 | Kamon et al. | 354/34 |
| 4,368,966 | 1/1983 | Hagyuda | 354/131 |

Primary Examiner—Russell E. Adams
Attorney, Agent, or Firm—Robert S. Smith

[57] ABSTRACT

An electronic flash unit having a thin-walled housing (2) in which is accommodated a reflector (3) with a discharge flash lamp (4) and which on the light-emanating side is provided with a photosensitive cell (6) for measuring a quantity of light reflected from an object to be photographed, which cell switches off the discharge flash lamp (4) by means of an electric circuit after measurement of a light dose.

According to the invention, the wall of the housing (2) is provided with means, such as an upright edge (7), for receiving an end of a light-conducting fiber cable (9), which end is arranged in front of the photosensitive cell.

2 Claims, 3 Drawing Figures

ELECTRONIC FLASH UNIT

This is a continuation of application Serial No. 456,941, filed Jan. 10, 1983, now abandoned.

The invention relates to an electronic flash unit having a thin-walled housing, in which is accommodated a relfector with a discharge flash lamp and which on the light exit side is provided with a photosensitive cell which is connected to a dosimeter for measuring a quantity of light relfected from an object to be photographed and switches off the discharge flash lamp by means of an electric circuit after measurement of an adjustable dose of light. Such a flash unit is generally known under the designation "Computer flash unit".

The housing of such a flash unit (see, for example, German Offenlegungsschrift No. 3038619) is provided with a connection member, by means of which the flash unit can be secured on a photocamera. The dose of light measured by the photosensitive cell, which is reflected from an object to be photographed, is proportional to the illumination intensity and to the exposure time. With the arrangement of the electronic flash unit on the camera, the illumination intensity at the area of the photosensitive cell is proportional to the illumination intensity measured at the area of the objective lens of the camera.

In given applications, it is desirable that the flash unit can be operated also at an area which is located at a comparatively large distance from the camera, for example, when portraits or pictures are photographed, in which process, for example, an oblique angle to the object to be photographed is desired.

The distance of the flash unit from the object to be photographed in these applications often deviates from the distance of the object from the camera. The angle, at which the object is viewed, is then also different for the camera and the flash unit. The value of the illumination intensity measured by the photosensitive cell in the flash unit then strongly deviates from the value that would be measured at an area of the flash unit near the camera. The quantity of light to be emitted by the flash unit under such conditions strongly deviates from the quantity which is required to take a photograph of high quality.

The invention has for its object to provide an electron flash unit which can be operated at a comparatively large distance from the camera, but in which the quantity of light to be emitted by this unit can be controlled from an area on or in the immediate proximity of the camera.

According to the invention, this is achieved with an electronic flash unit of the kind mentioned in the preamble in that the wall of the housing of the electronic flash unit is provided with means for receiving an end of a lightconducting fiber cable, this end being arranged in front of the photosensitive cell.

When a user arranges the second free end of the glass fiber cable in the proximity of the camera, during operation of a flash unit at a comparatively large distance from this camera the illumination intensity nevertheless is measured at an area in the immediate proximity of the photocamera. The light dose to be emitted by the flash unit is then controlled from a point near the camera. The light reflected from the object to be photographed towards the photocamera in fact is intercepted by the free end of the cable and is then supplied to the photosensitive cell in the electronic flash unit.

The light-conducting fiber cable comprises at least one glass or plastics fiber, but in a practical embodiment, the cable comprises a plurality (for example, about twenty) of twisted glass fibers having a diameter of 0.15 mm. The said glass fiber cable is then provided with a flexible sheath of synthetic material.

By the use of a fiber cable in a flash unit according to the invention, no additional electrical measures are necessary for the said aim. The material is moreover of very light weight and can be easily manipulated. Furthermore, such a fiber cable as compared with the known electric cables is free from vulnerable connection contacts and is not very susceptible to fracture and the like.

The light-conducting fiber cable in a practical embodiment can be detached from the housing of the flash unit. The connection of the end of the fiber cable to the housing can be established, for example, in that the end is provided with arms of a flexible material (for example, synthetic material), which can be clamped by the user around the housing, the light-emanating end of the cable being arranged in front of the cell. In a preferred embodiment, the housing wall of the flash unit is provided at the area of the photosensitive cell with an upright edge, which (for example, through a clamping or snap connection) cooperates with a cylindrical sheath (for example, of metal) which is secured to the end of the fiber cable. The use of special clamps and the like is then avoided.

The other end of the light-conducting fiber cable may be secured by the user, for example, to point on the wall of the photocamera, the end faces of the various fibers of which the cable is composed facing the object to be photographed.

The illumination intensity which particularly with the use of a comparatively long fiber cable is measured by the photosensitive cell may deviate, due to the attenuation of the illumination intensity in the fibers and due to loss of light at the area of the transition from the cable to the cell and the like, from the illumination intensity to be measured at the cable input, which cable is arranged on the photocamera. In a particular embodiment of the electronic flash unit according to the invention, for this purpose the sensitivity to be measured by the photosensitive cell when the end of the fiber cable is arranged in front of the cell is subject to correction. This is obtained, for example, in that, when the cable is arranged in front of the cell, the diaphragm aperture of the cell is enlarged or in that an optical system (for example, a field lens) is arranged in front of the free end (near the camera), the viewing angle being enlarged. It is further possible, when the cable is arranged in front of the cell, to excite an electric circuit. As a result, the current strength to which the flash unit is adjusted to supply a given quantity of light is corrected so that the desired quantity of light is emitted in spite of the slightly weaker luminous signal.

Embodiments of the invention will be described hereinafter with reference to the accompanying drawing. In the drawing.

Figure 1:
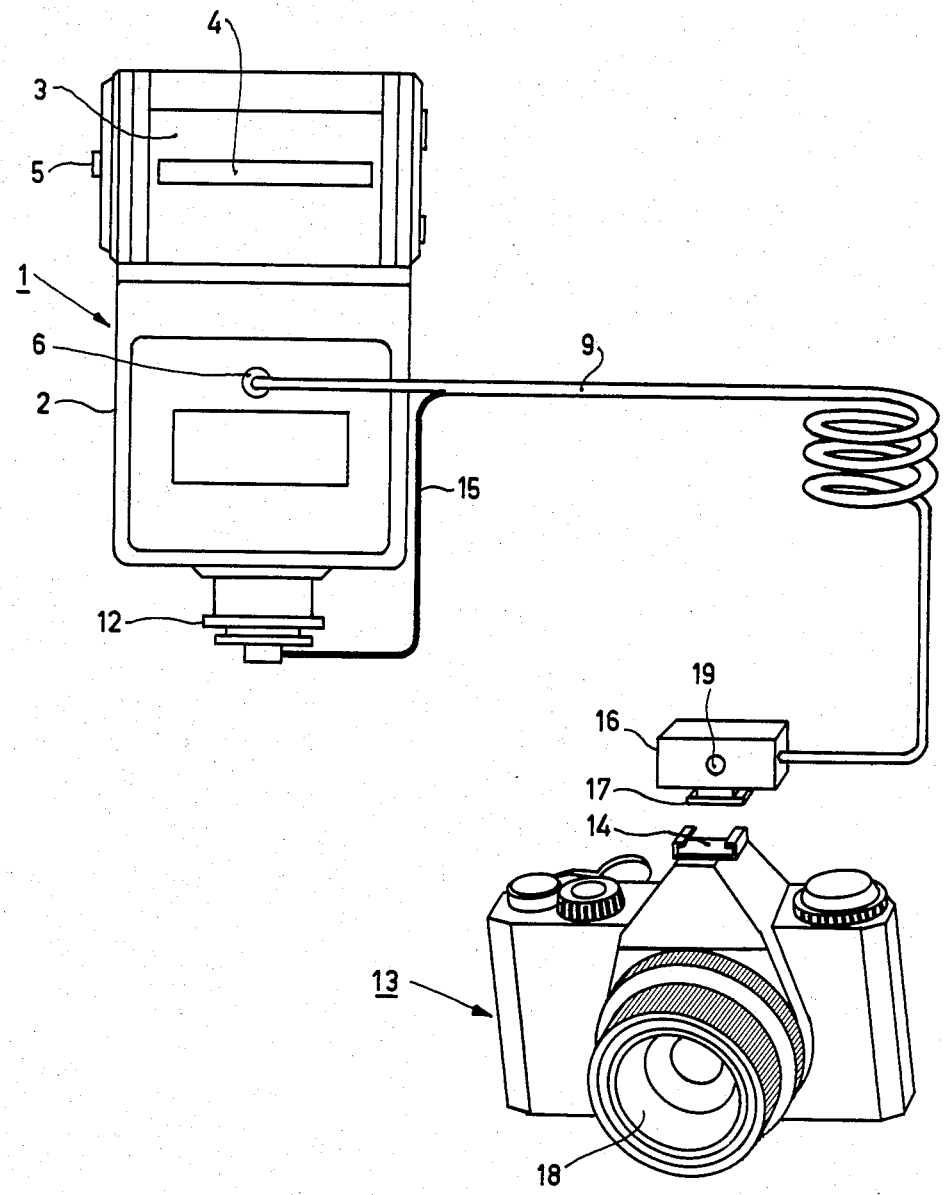
FIG. 1 is a front elevation of an electronic flash unit according to the invention, which is connected to a photocamera through a light-conducting glass fiber cable.

In FIG. 1, reference numeral 1 denotes an electronic flash unit which is provided with a thin-walled housing 2 of synthetic material. The housing accommodates a reflector 3 with a discharge flash lamp 4. The reflector 3 can be rotated about its longitudinal axis by means of a handle 5 which is provided in the side wall of the housing. On the light exit side of the housing of the electronic flash unit is arranged a photosensitive cell which is connected to a dosimeter for measuring a quantity of light reflected from an object to be photographed and switches off the discharge flash lamp 4 by means of an electric circuit arranged in the housing after measurement of an adjustable dose of light.

The wall of the housing 2 is further provided with an upright edge 7 (see FIG. 2) which is suitable to receive an end 8 of a light-conducting glass fiber cable 9 provided with a coating of synthetic material. The end 8 is then arranged in front of this photosensitive cell 6. The end 8 of the light-conducting glass fiber cable 9 is provided with a cylindrical metal sheath 10 (see FIG. 2) which can be secured to the upright edge 7 by means of a clamping plug-in connection 11. The electronic flash unit is provided with a base 12 which, when it is arranged on the photocamera 13, co-operates with the shoe 14. When the flash unit is operated by the user at a comparatively large distance from the photocamera, (as is shown in FIG. 1), the base 12 is brought into contact with the shoe 14 through the electric wire 15. In the drawing, the electric wire 15 is surrounded by the coating of the cable 9. The second end of the cable 9 is accommodated in an adaptor 16 of synthetic material which is provided with a base 17 which can be arranged on the camera 13. The base 17 then co-operates with the shoe 14 on the camera. The adaptor further receives the second end of the wire 15 (see FIG. 3).

Figure 2:
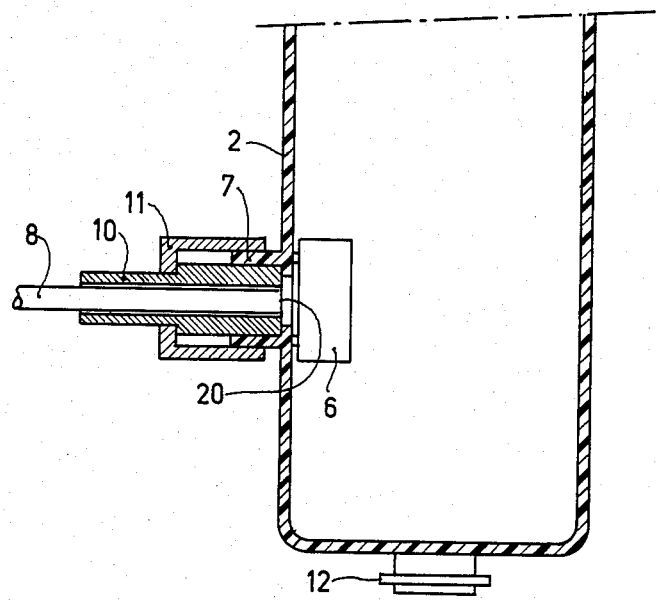
FIG. 2 is a diagrammatic sectional view of the connection between the cable and the housing of the flash unit.
Figure 3:
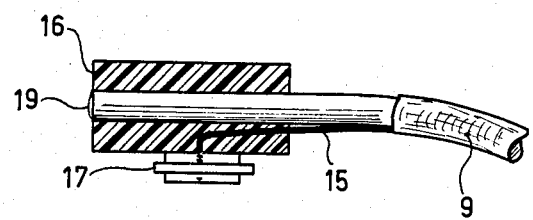
FIG. 3 is a diagrammatic sectional view of the end of the glass fiber cable which can be arranged on the camera.

The end of the cable 9 in the adaptor 16 then points in the same direction as the objective lens 18 of the camera. The cable 9 consists of a bundle of light-conducting fibres (for example, twenty fibers, diameter 0.15 mm, length about 2 m), which is surrounded by a flexible coating of synthetic material. The fiber ends are located in a flat plane. In the adaptor 16, a field lens 19 for enlarging the viewing angle is arranged in front of the fiber ends. The other ends of the fibers also meet in a flat plane 20; this is shown in FIG. 2.

What is claimed:

1. An electron flash unit having a thin-walled housing, in which is accommodated a reflector with a discharge flash lamp and which on the light exit side is provided with a photosensitive cell, which is connected to a dosimeter for measuring a quantity of light reflected from an object to be photographed and switches off the discharge flash lamp by means of an electric circuit after measurement of an adjustable dose, of light, characterized in that the wall of the housing is provided with means for receiving an end of a light-conducting fiber cable, which end is arranged in front of the photosensitive cell, said unit having a discrete electrically conductive wire extending from said flash unit to a connector for an associated camera.

2. An electron flash unit as claimed in claim 1, characterized in that the wall of the housing is provided at the area of the photosensitive cell with an upright edge which co-operates with a cylindrical sheath which is secured to the end of said fiber cable.

* * * * *